United States Patent
Trinh et al.

(10) Patent No.: US 6,654,956 B1
(45) Date of Patent: Nov. 25, 2003

(54) METHOD, APPARATUS AND COMPUTER PROGRAM PRODUCT FOR SYNCHRONIZING PRESENTATION OF DIGITAL VIDEO DATA WITH SERVING OF DIGITAL VIDEO DATA

(75) Inventors: Vincent Trinh, Pleasanton, CA (US); Michael Ignaszewski, Milpitas, CA (US); Jacques Mahe, Fremont, CA (US)

(73) Assignee: Sigma Designs, Inc., Milpitas, CA (US)

( * ) Notice: Subject to any disclaimer, the term of this patent is extended or adjusted under 35 U.S.C. 154(b) by 0 days.

(21) Appl. No.: 09/546,055

(22) Filed: Apr. 10, 2000

(51) Int. Cl.[7] ................ H04N 7/173; H04N 9/475; H04N 7/12; H04N 11/02; H04N 11/04

(52) U.S. Cl. ................ 725/100; 725/91; 725/131; 348/512; 348/515; 348/518; 348/423.1; 348/425.4; 375/240.28

(58) Field of Search .................... 348/515, 512, 348/518, 423.1, 425.4; 375/240.28; 725/100, 91, 95, 131

(56) References Cited

U.S. PATENT DOCUMENTS

| | | | |
|---|---|---|---|
| 4,675,612 A | 6/1987 | Adams et al. ............. 328/63 |
| 4,713,621 A | 12/1987 | Nakamura et al. ........ 328/55 |
| 5,046,023 A | 9/1991 | Katsura et al. | |
| 5,065,346 A | 11/1991 | Kawai et al. | |
| 5,142,380 A | 8/1992 | Sakagami et al. | |
| 5,151,875 A | 9/1992 | Sato | |
| 5,231,492 A | 7/1993 | Dangi et al. | |
| 5,276,807 A | 1/1994 | Kodama et al. | |
| 5,309,111 A | 5/1994 | McNeely et al. | |
| 5,397,853 A | 3/1995 | Koguchi | |
| 5,471,576 A | 11/1995 | Yee | |
| 5,528,308 A * | 6/1996 | Alelyunas et al. ......... 348/512 |
| 5,528,309 A | 6/1996 | Nguyen ................... 348/587 |
| 5,574,572 A | 11/1996 | Malinowski et al. ...... 358/451 |
| 5,596,420 A * | 1/1997 | Daum ...................... 386/110 |
| 5,598,352 A * | 1/1997 | Rosenau et al. ........ 715/500.1 |
| 5,603,016 A * | 2/1997 | Davies .................... 713/400 |
| 5,638,130 A | 6/1997 | Linzer ..................... 348/445 |
| 5,642,171 A * | 6/1997 | Baumgartner et al. .... 348/515 |
| 5,650,824 A | 7/1997 | Huang .................... 348/453 |
| 5,719,511 A | 2/1998 | Le Cornec et al. ....... 327/146 |
| 5,818,468 A | 10/1998 | Le Cornec et al. | |
| 5,818,547 A * | 10/1998 | Ozaki .................... 348/425.4 |
| 5,832,120 A | 11/1998 | Prabhakar et al. | |
| 5,877,815 A * | 3/1999 | Tsujimura ................ 348/515 |
| 5,959,684 A * | 9/1999 | Tan et al. ................. 348/515 |
| 5,982,459 A | 11/1999 | Fandrianto et al. ..... 348/845.2 |
| 6,018,376 A * | 1/2000 | Nakatani ............. 375/240.28 |
| 6,184,936 B1 | 2/2001 | Hu | |
| 2001/0043282 A1 | 11/2001 | Hu | |

FOREIGN PATENT DOCUMENTS

| | | |
|---|---|---|
| WO | WO 9210911 A | 6/1992 |
| WO | WO 99/18714 | 4/1999 |

OTHER PUBLICATIONS

Tsai Y T: "Color Image Compression for Single–Chip Cameras" IEEE Transactions on Electron Devices, vol. 38, No. 5, May 1, 1991, pp. 1226–1232, XP000200683, see abstract; figures 1,6.

* cited by examiner

Primary Examiner—John Miller
Assistant Examiner—Michael W. Hoye
(74) Attorney, Agent, or Firm—Swernofsky Law Group PC

(57) ABSTRACT

The present invention provides a method for matching the rate of presentation of digital video data at a receiver/client with the rate the server is serving the data without the need of a voltage control oscillator or other hardware. An embodiment of the invention compares the presentation time at the receiver with the server elapsed time estimated from timestamp values on the served data. When the presentation time and the server elapsed time differ by an unacceptably large amount, an adjustment is made to the audio data stream to re-synchronize the presentation time with the elapsed time, which effectively also synchronizes the overall presentation rate with the overall server rate. The video data stream is then synchronized to the adjusted audio stream. The video data stream and audio data stream are converted to analog signals for presentation.

27 Claims, 3 Drawing Sheets

METHOD, APPARATUS AND COMPUTER PROGRAM PRODUCT FOR SYNCHRONIZING PRESENTATION OF DIGITAL VIDEO DATA WITH SERVING OF DIGITAL VIDEO DATA

BACKGROUND OF THE INVENTION

1. Field of the Invention

This invention relates to the field of digital video. Specifically, this invention is a method, apparatus, and system for synchronizing presentation of video data at a receiver with serving of data at a server.

2. Background

In digital video, a receiver/client can receive digital video data that is served by a server over a communication channel. Digital video data includes a video component and an audio component. The audio component has a fixed audio time interval. The video component typically has a fixed number of frames per second. The data is typically sent in a standard digital video format such as the MPEG format; however, the invention also applies to time-stamped information that is in a format other than MPEG.

The server typically has MPEG encoding capability, though this is not necessary when pre-encoded files are being served. The receiver is a client to the server. The receiver includes a video interface that is capable of decoding MPEG data. The terms "receiver", "receiver/client", and "receiver/decoder" all refer to the receiver.

MPEG data includes timing information, which is used to drive presentation devices where the data needs to be presented in accordance with the time stamp to provide a smooth presentation and where the time stamp is used to synchronize the audio and video presentations. Time stamps are used to indicate to a decoder/receiver when a specific event should occur. For the video component, the time stamp tells the decoder/receiver when a frame should be displayed. For the audio component, the time stamp tells the decoder the specific moment in time when a sound should be played. The amount of data necessary to provide a specific time interval of presentation, such as 1 second, can vary widely.

The receiver must process the MPEG data before that data can be used to drive a presentation device such as a monitor and/or speakers. The processing includes demultiplexing the MPEG data into an audio stream and a video stream, synchronizing the playback of the separated data streams, and converting the digital data to analog signals. Processing can be accomplished in software or hardware, although hardware is usually used because of its speed advantage.

The server serves video data in real-time; that is, the data is served at approximately the rate at which it should be presented. The server knows when it should deliver the data based on the time stamps embedded in the MPEG stream. Timestamps in MPEG are included periodically, and at a minimum once every 0.7 seconds. Time measurement at the server governs the rate at which the server serves data. (The server can send pre-encoded files or can send real-time data. In the case of a pre-encoded file, the clock of the server processor determines the rate. In the case of a real-time feed, the clock inside the encoder at the server determines the rate. In this application, the term "server clock" is used generically to indicate whatever clock is determining the serving rate of the video date.)

The receiver consumes data in real-time. If time at the server were measured exactly equal to time at the receiver, the receiver would consume data at the same rate as it is served, and presentation of the data would be smooth.

(The receiver typically buffers an amount of data prior to beginning display, thus a temporary drop in the rate of reception of the data due to interruption of the communication link or server is usually not an issue. A buffer is usually included in both the receiver processor as well as the decoder/video inteface. The size of the buffer is not critical, but should be big enough so that such network jitter is not an issue.)

However, in practical application, time measurement at the server and at the receiver are not exactly the same. This results in data being served at a different rate than it is consumed, and eventually buffer underflow or overflow at the receiver occurs. Underflow or overflow results in undesirable effects such as jumpiness of the picture.

This example uses exaggerated numbers to illustrate the problem resulting from the two clocks measuring time differently: Suppose a server sends 1 byte every 1 second (according to the server's clock), and a receiver consumes 1 byte every 1 second (according to the client's clock). The receiver has a 5-byte buffer. Suppose the server's clock is perfectly accurate. The receiver's clock is flawed. "Time" moves slower in this clock. For every 2 "real" seconds that pass, the receiver's clock counts 1 second passing. The buffer of the receiver will overflow within 5 or 6 seconds due to the different rates of serving and consuming the data.

In practical application, the clocks used in typical servers and receivers are much more accurate than in the previous example, but typically there is about a 50 parts per million (ppm) variance. Assuming a 50 ppm variance, every 200000 bytes there will be a difference of around 1 byte. A commonly used serving rate is 48,000 samples per second and commonly there are 4 bytes per audio sample. This results in a potential discrepancy of about 1 byte per second (1 sample every 4 seconds).

In addition, a further source of error from the "true" time is that the server clock as well as the receiver clock can experience internal variation—i.e. they each can speed up sometimes and slow up at other times. Thus at times the server clock may be counting time faster than the receiver clock, and at other times the opposite may happen.

It should be noted that this problem of lack of synchronization is not present when the digital video data is from a local source. For instance, synchronization of serving rate and consumption rate by the receiver is not a problem when the data is on a DVD disk and is played on a local DVD player, because the receiver can access the data as it requires it.

It is known to use a phase lock loop circuit implemented using a voltage control oscillator to match the data presentation rate with the server rate. However, these hardware components are relatively expensive.

Thus, it would be advantageous to synchronize presentation of video data at a receiver with the rate the data is served by a video server without the need for a voltage control oscillator. This is achieved through real-time adjustments to the audio stream and subsequent synchronization of the video stream with the adjusted audio stream.

SUMMARY OF THE INVENTION

The present invention provides a method for matching the rate of presentation of digital video data at a receiver/client with the rate the server is serving the data without the need of a voltage control oscillator or other hardware. An embodiment of the invention compares the presentation time at the receiver with the server elapsed time estimated from timestamp values on the served data. When the presentation time and the server elapsed time differ by an unacceptably large amount, an adjustment is made to the audio data stream to re-synchronize the presentation time with the elapsed time, which effectively also synchronizes the overall presentation rate with the overall server rate. The video data stream is then synchronized to the adjusted audio stream. The video data stream and audio data stream are converted to analog signals for presentation.

The foregoing and many other aspects of the present invention will no doubt become obvious to those of ordinary skill in the art after having read the following detailed description of a preferred embodiments that are illustrated in the various drawing figures.

DESCRIPTION OF A PREFERRED EMBODIMENT

Figure 1:
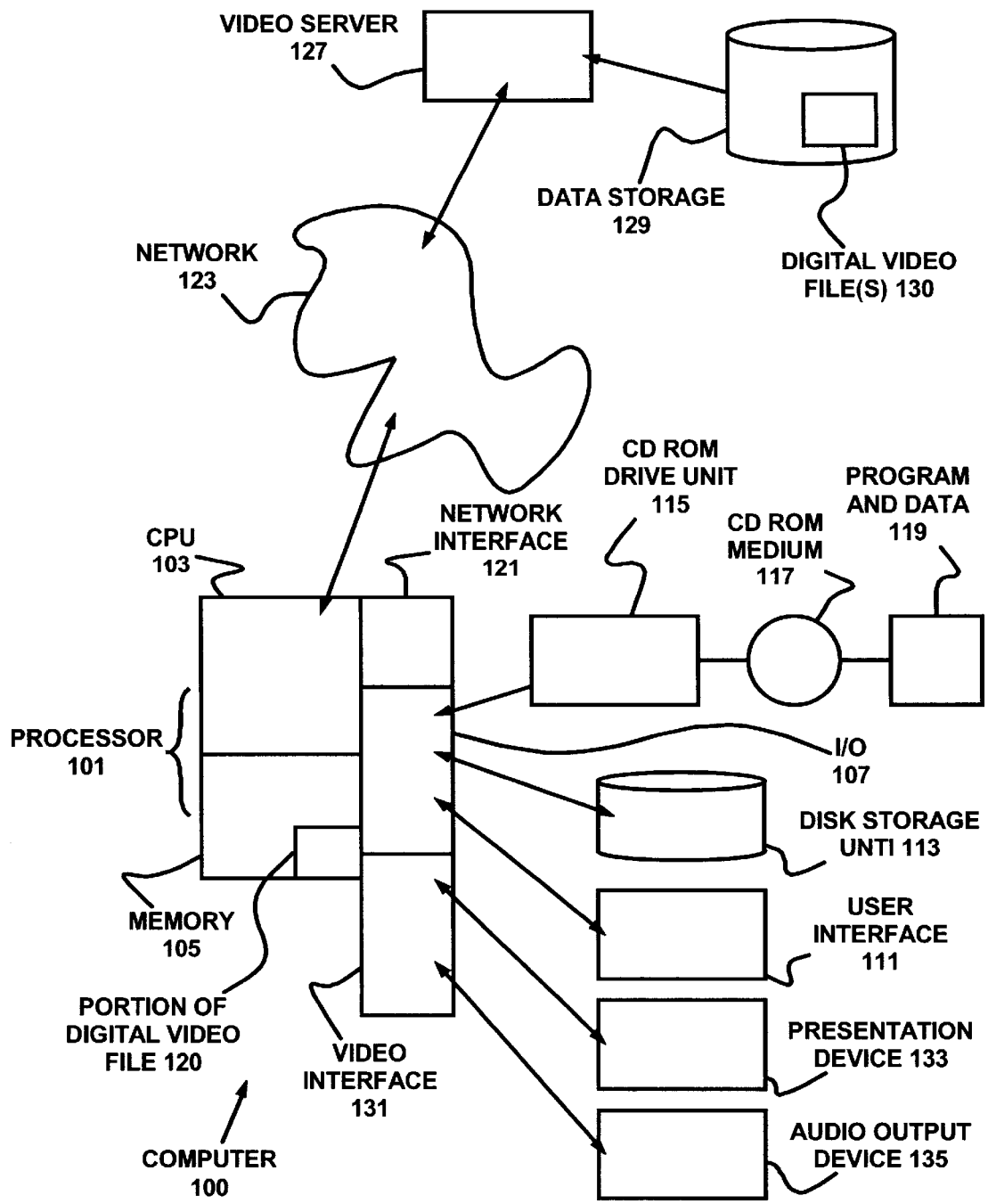
FIG. 1 illustrates a computer system capable of using the invention in accordance with a preferred embodiment.

FIG. 1 illustrates a computer, indicated by general reference character 100, that incorporates the invention. The computer 100 includes a processor 101 that incorporates a central processor unit (CPU) 103, a memory section 105 and an input/output (I/O) section 107, and that can also incorporate a clock (not shown). The input/output (I/O) section 107 is connected to a user interface 111, a disk storage unit 113 and a CD-ROM drive unit 115. The CD-ROM drive unit 115 can read a CD-ROM medium 117 that typically contains a program and data 119. The CD-ROM drive unit 115 (along with the CD-ROM medium 117) and the disk storage unit 113 comprise a filestorage mechanism. The memory section 105 can include a portion of a digital video file 120.

A network interface 121 connects the computer 100 to a network 123. A video server 127 is connected to the network. The video server 127 is connected to a data storage 129. The data storage 129 can include one or more remote digital video files 130.

The input/output (I/O) section 107 is connected to a video interface 131. The video interface 131 is connected to a presentation device 133 and an audio output 135. It will be clear to one skilled in the art that the various devices including the presentation device 133, audio output 135, and video interface 131 can be connected in different configurations and can include elements such as monitors, keyboards, and speakers.

One skilled in the art will understand that not all of the displayed features of the computer 100 need to be present for the invention; that the CD-ROM drive unit 115 provides a mechanism for reading removable media and thus can be replaced by any other drive that is capable of reading compatible removable media; and that the invention can be practiced by customized logic that implements the steps of the invention, and that digital video formats in addition to MPEG can be used.

Figure 2:
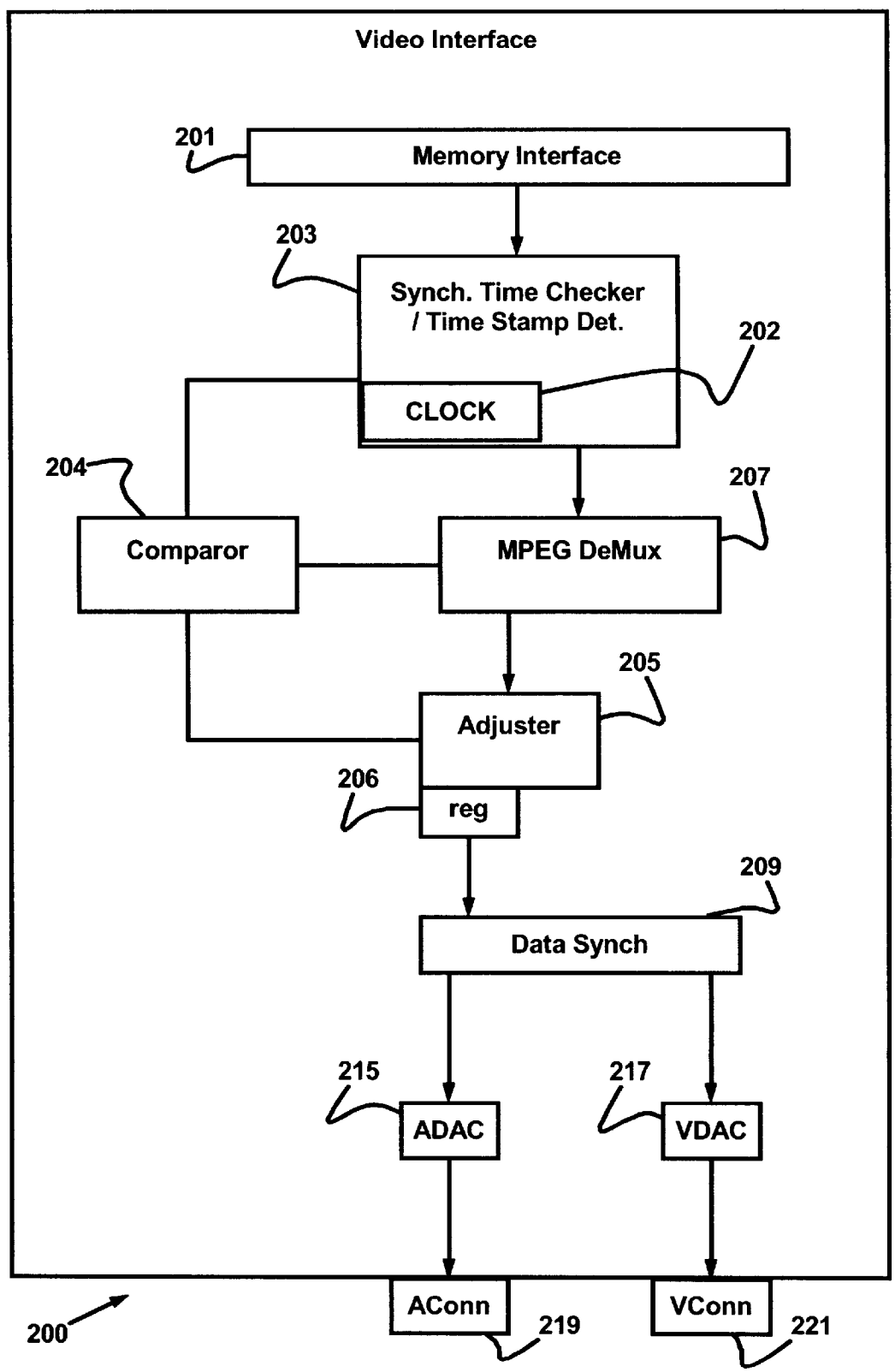
FIG. 2 illustrates a video interface in accordance with a preferred embodiment of the invention.

FIG. 2 illustrates a video interface, indicated by general reference character 200. This video interface 200 is an example of the video interface 131 of FIG. 1. The video interface has a memory interface 201.

Video data is supplied to the video interface 200 through the memory interface 201. The MPEG data can be sourced from one of the remote digital video files 130 stored in data storage 129 served over the network 123 by the video server 127; or can be sourced from a file residing locally on CD-ROM medium 117, or can be an MPEG formatted file stored and communicated to the memory interface by any known means. In the case of sourcing from a local CD-ROM medium, there is no need for synchronization with a remote clock, so in such a case the invention need not be used, though such data can be processed through the video interface 200.

The MPEG data flows through a synchronization time checker/time stamp detector 203, to a demultiplexer 207. The synchronization time checker/time stamp detector 203 keeps track of local time using a clock 202, and periodically (for example, about every ten minutes) it will start monitoring the data stream for a time stamp. Upon detecting a time-stamp in the MPEG data stream, the synchronization time checker/time stamp detector 203 passes to the comparor/calculator 204 the information about the time-stamp and the local time when the time-stamp was detected. The comparor/calculator 204 compares a presentation time with an elapsed time and estimates how much adjustment, if any, is required to match the rate at which the server is serving the data with the local (receiver) presentation rate, and if adjustment is required sends an adjustment value representing the necessary adjustment to an adjustor 205 having a register 206. The adjustment value is stored in the register 206. This is more fully discussed in the description of FIG. 3 below.

Alternatively, the synchronization time checker/time stamp detector 203 can obtain the time from a clock (not shown) incorporated in the processor 101, or can otherwise obtain the time from any clock referred to by the receiver. Intervals longer than or shorter than 10 minutes can be used; however, one embodiment that works well uses intervals between 5 minutes and 10 minutes.

The data continually flows to a demultiplexer 207 from the synchronization time checker/time stamp detector 203. The demultiplexer 207 demultiplexes the MPEG data into a video data stream and an audio data stream (the audio data stream results from the decoding of the demultiplexed mpeg audio data), as is known in the art. An audio sample is the value of the sound wave at a particular moment. The audio data stream flows to the adjustor 205 where samples are added or dropped from the audio data stream in accordance with the adjustment value stored in the register 206, as described below in the description of FIG. 3.

The adjusted audio data stream that is output from the adjustor 205 and the video data that is output from the demultiplexer 207 are sent to an audio-video synchronizer 209. The audio-video synchronizer 209 aligns the audio data and the video data in accordance with their respective timing stamps as is known in the art.

The audio data stream flows to an audio digital/analog converter 215 which converts the audio data stream to an analog audio signal. The video data stream flows to a video digital/analog converter 217 which converts the video data stream to an analog video signal. The audio analog signal and the video analog signal are then sent to an audio connector 219 and a video connector 221 for transfer to audio and video presentation devices, respectively.

Figure 3:
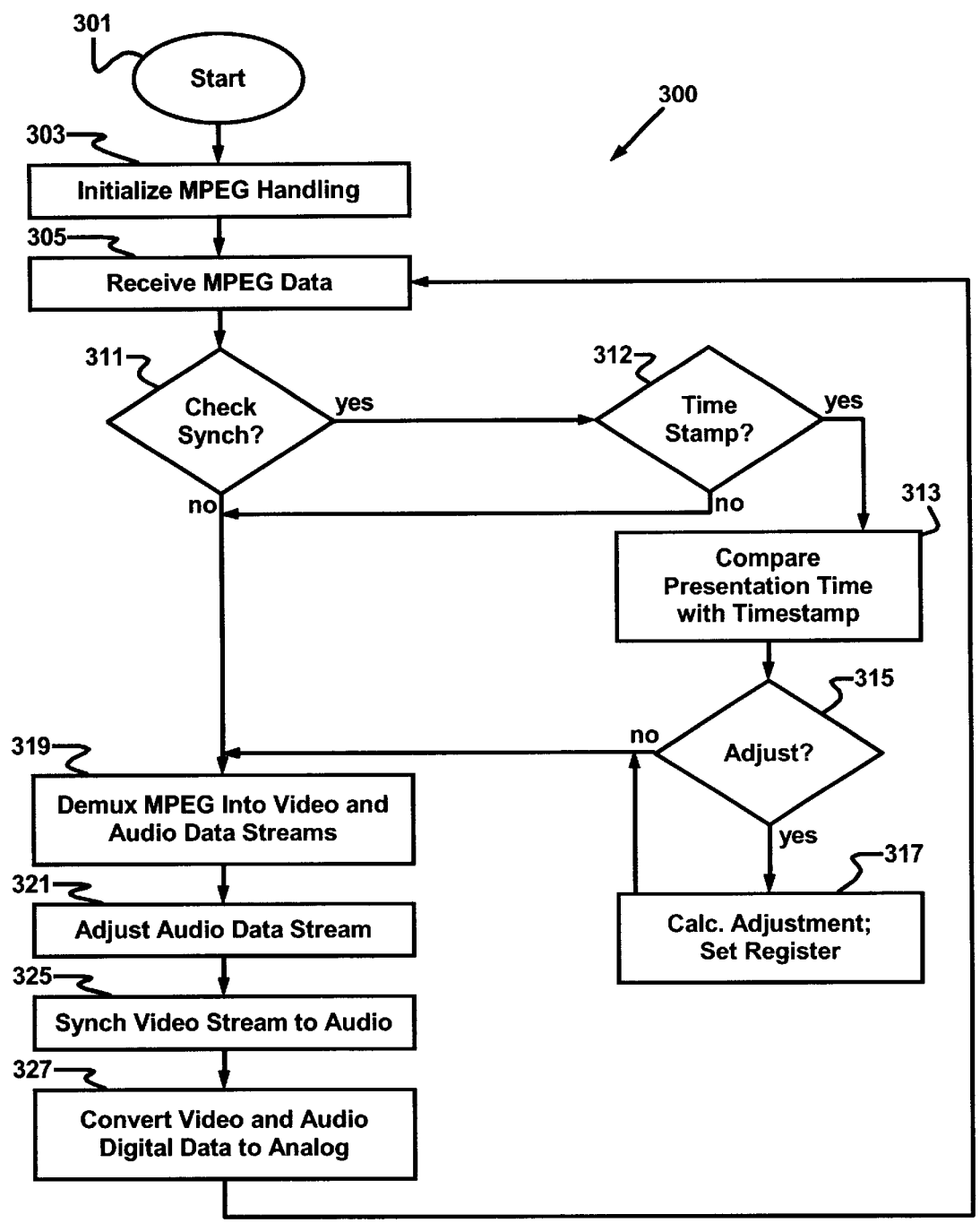
FIG. 3 illustrates a method of the invention in accordance with a preferred embodiment.

FIG. 3 illustrates a method for synchronizing display of a digital video file with the rate of serving by a video server, indicated by general reference character 300.

The method initiates at a start terminal 301. Initialization of variables and initialization of MPEG handling is accomplished at an initialization step 303. In the preferred embodiment, initialization includes zeroing out the register 206, zeroing out of the presentation time, and zeroing out the time since the last synchronization check.

At a 'receive MPEG data' step 305, MPEG data is obtained at the memory interface 201.

A 'check synchronization' decision step 311 determines whether the adjustment should be checked. In a preferred embodiment the synchronization is checked approximately every 10 minutes, measured using local clock time. The periodicity of the measurement and the interval is not critical. If it has been less than 10 minutes since the synchronization was checked then the 'check synchronization' decision step 311 result is NO and the process proceeds to a 'demultiplex data' step 319 described below.

On the other hand, if it has been 10 minutes or more since the last time the synchronization was checked, the result of the 'check synchronization' decision step 311 is YES and the process proceeds to a 'detect time stamp' step 312. In this step the data stream is monitored and the next time stamp is detected. The data flows through to a 'demultiplex data' step 319 until a time stamp is detected in the data stream. Upon detecting a timestamp, the process proceeds to a 'compare presentation time with timestamp' step 313. (In an alternate embodiment that measures the time between synchronizations using the elapsed time, the 'detect time stamp' step 312 must be prior to the 'check synchronization' decision step 311.)

It is to be noted that in MPEG format the time-stamp is included in the system layer, which is above the packet layer. Because of where the time-stamp is located in the MPEG format, the time-stamp is detected prior to demultiplexing; for other digital video formats the opposite may be true. One skilled in the art will understand how to implement the invention accordingly.

The receiver presentation time in a preferred embodiment represents the total amount of time as measured at the receiver that the MPEG data has been presented, for example, it might be the length of time since the start of a movie. In a preferred embodiment, the server elapsed time is estimated to be the time elapsed from the beginning of the MPEG data, taken from the timestamp value. (It is not possible to directly measure, at the receiver, the server clock rate.) Using the total presentation time and total elapsed time has the effect of adjusting for the cumulative error caused by the clocks' errors and eliminates the need to keep track of errors caused by the finiteness of the audio data sampling, as described below.

In an alternate embodiment an intermediate time interval (i.e. measured from a point later than the start of receiving data) can be used.

If the difference between the presentation time and server elapsed time is less than the time required to process a specified number of audio samples, the difference is considered acceptable, the output of the 'make adjustment' decision step 315 is NO, and the process proceeds to the 'demultiplex data' step 319. If the difference is at least half the audio time interval, the difference is considered unacceptable and the result of the 'make adjustment' decision step 315 is YES, and the process proceeds to a 'calculate adjustment and set register' step 317.

In a preferred embodiment, the specified number of audio samples is about 100 samples. However, the actual number of samples is not critical so long as a discrepancy between the server elapsed time and the presentation time can be timely detected and compensated for.

The 'calculate adjustment and set register' step 317 compares the receiver presentation time with the server elapsed time. This difference between these times is converted into an integer value that represents the number of samples that must be added or dropped to synchronize the presentation with the served data. The integer value is preferably calculated by dividing the time difference by the time interval of the audio data and then rounding the absolute value of the difference. If the presentation lags the served data, the integer value is negated. In an alternate embodiment, where an intermediate time interval is used, the difference between the integer value and the number that is rounded to the integer can be stored and taken into account the next time an adjustment is made.

The register 206 is set to this integer value, and the process proceeds to the 'demultiplex data' step 319.

It is to be noted that in the preferred embodiment the total presentation time is compared to the total elapsed time. Because each comparison is made of the total times, there is less error and there is no need to track the round-off error caused by only being able to add or drop integer numbers of bytes. Where an intermediate time interval is used, the round-off error should be kept track of.

In the 'demultiplex data' step 319, the data is demultiplexed into an audio stream and a video stream, as known in the art. The demultiplexing of data preferably occurs in parallel with the steps 312–317.

In an 'adjust audio stream' step 321, the audio component is adjusted in the following manner, responsive to the register 206. If the the register 206 is positive, a corresponding number of sample points are added to the audio stream, thereby synchronizing the presentation of data at the receiver with the server rate. If the register 206 is negative, a corresponding number of samples are dropped from the audio stream. As the samples are added or deleted, the register is adjusted to reflect the addition or deletion (not shown on figures). However, there are many ways of adding or dropping samples based on the value in the register, and one skilled in the art will understand how to do so.

In a preferred embodiment, one or more samples are added by duplicating the sample then passing through the adjustor 205 the appropriate number of times. For example, the sample passing through the adjustor 205 at any time the register 206 is non-zero will be duplicated N times if the register is N, a positive integer. Other ways of adding data are described subsequently. In the preferred embodiment, an audio sample is 4 bytes.

It is to be noted the adjustment may be stored other than in the described register. For instance, the amount of adjustment to be made can be stored in RAM.

In a preferred embodiment, one or more sample points are dropped from the audio stream by dropping the appropriate number of samples then passing through the adjustor 205, whenever the register has a negative value.

In an alternative embodiment, the audio data steam can be adjusted at specific time intervals, such as every 15 minutes.

In an alternative embodiment, samples can be added by methods other than duplication, for instance by averaging surrounding sample values and duplicating this average value the desired number of times.

The timing of when the adjustment is made and the manner in which sample data is added or deleted is not critical. In a preferred embodiment, the adjustment is made whenever the register contains a non-zero value, and addition of N samples is made by duplication N times of the sample then passing through the adjustor, deletion of N samples by dropping the next N samples that pass through the adjustor.

The process proceeds to a 'synchronize video to audio' step 325, where the video stream is synchronized to the adjusted audio stream. If the video stream and the adjusted audio stream are not aligned, that is, the timing information does not agree, then the video stream is adjusted to match the adjusted audio stream, as known in the art. The audio stream and video stream are converted to analog signals in a 'convert to analog' step 327 using the audio digital/analog converter 215 and the video digital/analog converter 217, respectively. The audio and video signals are output through the audio connector 219 and the video connector 221, respectively, for presentation.

Conclusion

One skilled in the art will understand that the invention provides a method for synchronize presentation of video data at a receiver with the rate the data is served by a video server, by making real-time adjustments to the audio stream and synchronizing presentation time and server elapsed time. The invention has the advantage that a phase lock loop circuit is not required, and that it is less expensive than existing methods.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein.

What is claimed is:

1. A method for synchronizing serving of a formatted digital video data stream that is served by a server with decoding of said formatted digital video data stream at a receiver including steps of:
   receiving said formatted digital video data stream at said receiver;
   demultiplexing said formatted digital video data stream into an audio data stream and a video data stream, said audio data stream having an audio time interval;
   checking whether serving of said formatted digital video data stream is synchronized with decoding of said audio data stream;
   performing, responsive to the step of checking, the further steps of:
     adjusting said audio data stream to synchronize with a server elapsed time, said step of adjusting resulting in an adjusted audio data stream;
     synchronizing said video data stream to said adjusted audio data stream.

2. A method as in claim 1 wherein the step of checking is done periodically.

3. A method as in claim 1 wherein the step of checking includes steps of:
   monitoring said formatted digital video data stream for a time stamp;
   determining, responsive to the step of monitoring, whether a difference between a presentation time and a server elapsed time is acceptable.

4. A method as in claim 3, wherein said difference is acceptable if said difference is the time required to processes on the order of 100 audio samples.

5. A method as in claim 1, wherein said step of synchronizing the video data stream to said adjusted audio data stream is done responsive to a time stamp value.

6. A method as in claim 1, further including steps of:
   converting said audio data to an analog audio signal;
   converting said video data to an analog video signal;
   presenting said analog audio signal; and
   presenting said analog video signal.

7. A method as in claim 1 wherein the step of adjusting said audio data stream to synchronize with said server elapsed time includes steps of:
   loading a necessary adjustment value into a register;
   adjusting said audio stream in accordance with a value in said register.

8. A method as in claim 7, wherein the step of adjusting includes the steps of:
   if said register value is negative, dropping a number of samples in said audio data stream in accordance with said register value;
   incrementing the value of said register to reflect said number of samples.

9. A method as in claim 7, wherein the step of adjusting includes the steps of:
   if said register value is positive, duplicating a second number of samples in said audio data stream in accordance with said register value;
   decrementing the value of said register to reflect said number of samples.

10. An apparatus for synchronizing serving of a formatted digital video data stream that is served by a server with decoding of said formatted digital video data stream at a receiver including:
   a memory interface configured to receive said formatted digital video data stream at said receiver;
   a synchronization time checker configured to check whether serving of said formatted digital video data stream is synchronized with decoding of said audio data stream, said formatted digital video data stream flowing to said checker from said memory interface;
   a time stamp detector coupled to said checker, said time stamp detector configured to detect time stamps in said formatted digital video data stream;
   a demultiplexer coupled to said checker, said demultiplexer configured to demultiplex said formatted digital video data stream into an audio data stream and a video data stream, said audio data stream having an audio time interval, said formatted digital video stream flowing to said demultiplexer from said checker;
   a comparor/calculator coupled to said time stamp detector and coupled to said demultiplexer, said comparor/calculator configured to compare a presentation time with a server elapsed time and configured to calculate an adjustment value;
   an adjustor configured to receive said audio data stream and to adjust said audio data stream to synchronize with said server elapsed time, in accordance with said adjustment value, resulting in an adjusted audio data stream; and
   a audio-video synchronizer configured to synchronize the video data stream to said adjusted audio data stream, said audio-video synchronizer coupled to said adjustor and coupled to said demultiplexer, said video data stream flowing to said audio-video synchronizer from said demultiplexer, said adjusted audio stream flowing to said audio-video synchronizer from said adjustor.

11. An apparatus as in claim 10, further including:

an audio digital to analog converter (ADAC) configured to convert said audio data to an analog audio signal, said ADAC coupled to said audio-video synchronizer;

a video digital to analog converter (VDAC) configured to convert said video data to an analog video signal, said VDAC coupled to said audio-video synchronizer;

a first presentation device configured to present said analog audio signal, said presentation device coupled to said ADAC; and a second presentation device configured to present said analog video signal, said second presentation device coupled to said VDAC.

12. An apparatus as in claim 10 wherein said synchronization time checker is configured to perform periodically.

13. An apparatus as in claim 10, wherein said adjustor includes a register that holds a register value, and wherein said register is configured to change said register value responsive to said adjustment value and responsive to adjustments to said audio data stream made by said adjustor.

14. An apparatus as in claim 13 wherein if said register value is negative, said adjustor is configured to drop a number of samples in said audio data stream in accordance with said register value and increment the value of said register to reflect said number of samples.

15. An apparatus as in claim 13 wherein if said register value is positive, said adjustor is configured to duplicate a second number of samples in said audio data stream in accordance with said register value and to decrement the value of said register to reflect said second number of samples.

16. A computer program product that stores a program, the program including the steps of:

receiving said formatted digital video data stream at said receiver;

demultiplexing said formatted digital video data stream into an audio data stream and a video data stream, said audio data stream having an audio time interval;

checking whether serving of said formatted digital video data stream is synchronized with decoding of said audio data stream;

performing, responsive to the step of checking, the further steps of:

adjusting said audio data stream to synchronize with a server elapsed time, said step of adjusting resulting in an adjusted audio data stream;

synchronizing said video data stream to said adjusted audio data stream.

17. A computer program product as in claim 16 wherein the step of checking is done periodically.

18. A computer program product as in claim 16 wherein the step of checking includes steps of:

monitoring said formatted digital video data stream for a time stamp;

determining, responsive to the step of monitoring, whether a difference between a presentation time and a server elapsed time is acceptable.

19. A computer program product as in claim 18, wherein said difference is acceptable if said difference is the time required to processes on the order of 100 audio samples.

20. A computer program product as in claim 16, wherein said step of synchronizing the video data stream to said adjusted audio data stream is done responsive to a time stamp value.

21. A computer program product as in claim 16, further including steps of:

converting said audio data to an analog audio signal;

converting said video data to an analog video signal;

presenting said analog audio signal; and presenting said analog video signal.

22. A computer program product as in claim 16 wherein the step of adjusting said audio data stream to synchronize with said server elapsed time includes steps of:

loading a necessary adjustment value into a register;

adjusting said audio stream in accordance with a value in said register.

23. A computer program product as in claim 22, wherein the step of adjusting includes the steps of:

if said register value is negative, dropping a number of samples in said audio data stream in accordance with said register value;

incrementing the value of said register to reflect said number of samples.

24. A computer program product as in claim 22, wherein the step of adjusting includes the steps of:

if said register value is positive, duplicating a second number of samples in said audio data stream in accordance with said register value;

decrementing the value of said register to reflect said number of samples.

25. A method as in claim 1, wherein said steps of adjusting and synchronizing are effective to synchronize serving of said formatted digital video data stream with decoding of said formatted digital video data stream so as to help prevent underflow or overflow of a buffer at said receiver that receives said formatted digital video data stream from said server.

26. An apparatus as in claim 10, further comprising a buffer at said receiver that receives said formatted digital video data stream from said server, wherein said adjustor and said audio-video synchronizer are effective to synchronize serving of said formatted digital video data stream with decoding of said formatted digital video data stream so as to help prevent underflow or overflow of said buffer.

27. A computer program product as in claim 16, wherein said steps of adjusting and synchronizing are effective to synchronize serving of said formatted digital video data stream with decoding of said formatted digital video data stream so as to help prevent underflow or overflow of a buffer at said receiver that receives said formatted digital video data stream from said server.

* * * * *